United States Patent
Blouet

(10) Patent No.: US 10,083,696 B1
(45) Date of Patent: Sep. 25, 2018

(54) METHODS AND SYSTEMS FOR DETERMINING USER LIVENESS

(71) Applicant: Raphael Blouet, Bordeaux (FR)

(72) Inventor: Raphael Blouet, Bordeaux (FR)

(73) Assignee: DAON HOLDINGS LIMITED, George Town (KY)

( * ) Notice: Subject to any disclaimer, the term of this patent is extended or adjusted under 35 U.S.C. 154(b) by 0 days.

(21) Appl. No.: 15/451,460

(22) Filed: Mar. 7, 2017

(51) Int. Cl.
*G10L 17/00* (2013.01)
*G10L 17/08* (2013.01)
*G10L 17/22* (2013.01)
*G10L 17/26* (2013.01)

(52) U.S. Cl.
CPC .............. *G10L 17/08* (2013.01); *G10L 17/22* (2013.01); *G10L 17/26* (2013.01)

(58) Field of Classification Search
CPC ......... G10L 17/00; G10L 17/24; G06F 21/30; G06F 21/32
USPC .......................................................... 704/246
See application file for complete search history.

(56) References Cited

U.S. PATENT DOCUMENTS

| | | | | |
|---|---|---|---|---|
| 8,380,503 | B2 * | 2/2013 | Gross | G10L 15/22 704/244 |
| 9,002,706 | B2 | 4/2015 | Lopez et al. | |
| 9,431,016 | B2 | 8/2016 | Aviles-Casco et al. | |
| 2009/0259468 | A1 * | 10/2009 | Schroeter | G10L 17/20 704/246 |
| 2009/0319271 | A1 * | 12/2009 | Gross | G10L 15/22 704/246 |
| 2015/0088509 | A1 | 3/2015 | Gimenez et al. | |
| 2015/0206538 | A1 | 4/2015 | Rodriguez et al. | |
| 2016/0329046 | A1 * | 11/2016 | Gross | G10L 15/22 |

FOREIGN PATENT DOCUMENTS

GB    2 541 466 A    2/2017

OTHER PUBLICATIONS

Serizel Romain et al., "Supervised group nonnegative matrix factorisation with similarity constraints and applications to speaker id," IEEE, Mar. 5, 2017, pp. 36-40.

Lee D. D. et al., "Learning the parts of objects by non-negative matrix factorization," Nature, Macmillan Journals Ltd, vol. 401, No. 6755, Oct. 21, 1999, pp. 788-791.

Extended European Search Report for EPO counterpart application No. 18154810.8, dated Jun. 11, 2018, pp. 1-10.

* cited by examiner

*Primary Examiner* — Daniel Abebe

(74) *Attorney, Agent, or Firm* — Kevin McDermott, Esq.

(57) ABSTRACT

A method for determining user liveness is provided that includes calculating, by a computing device, a spectral property difference between voice biometric data captured from a user and user record voice biometric data. The user and the computing device constitute a user-computing device pair, and the voice biometric data is captured by the computing device during a verification transaction. Moreover, the method includes inputting the spectral property difference into a machine learning algorithm, calculating an output score with the machine learning algorithm, and determining the voice biometric data was captured from a live user when the output score satisfies a threshold score.

11 Claims, 7 Drawing Sheets

US 10,083,696 B1

METHODS AND SYSTEMS FOR DETERMINING USER LIVENESS

BACKGROUND OF THE INVENTION

This invention relates generally to biometric data captured from users, and more particularly, to methods and systems for determining user liveness based on biometric data captured from the user.

Users conduct many different types of transactions with service providers in person and remotely over the Internet. Network-based transactions conducted over the Internet may involve, for example, purchasing items from a merchant web site or accessing confidential information from a website. Service providers that own and operate such websites typically require successfully authenticating a user before allowing the user to conduct a desired transaction.

Typically, during network-based biometric authentication transactions conducted with a user at a remote location, the user provides a claim of identity and biometric data. The biometric data is generally captured from the user with a capture device most convenient to the user, for example, the user's smart phone or other smart device. For voice biometric data the capture device has sound recording capability. However, imposters have been known to impersonate users by providing a false claim of identity supported by fraudulent biometric data in an effort to deceive a service provider into concluding the imposter is the person he or she claims to be. Such impersonations are known as spoofing.

Impostors have been known to use many methods to obtain or create fraudulent biometric data of others that can be submitted during authentication transactions. For example, imposters have been known to eavesdrop on networks during legitimate network-based biometric authentication transactions to surreptitiously obtain genuine voice biometric data from a user, and to replay the obtained voice biometric data during fraudulent network-based authentication transactions.

It is difficult to detect replayed voice biometric data using known voice replay detection algorithms because such algorithms either determine too many live genuine users are not live, or fail to detect sufficient numbers of replays. Additionally, known voice replay algorithms are not user-device dependent. Consequently, known voice replay detection algorithms generally do not provide high confidence liveness detection support for entities dependent upon accurate biometric verification transaction results. Moreover, known voice replay detection algorithms have been known to use substantial computer system memory and to require substantial computing resources which increases the time and costs of determining user liveness.

BRIEF DESCRIPTION OF THE INVENTION

In one aspect, a method for determining user liveness is provided that includes calculating, by a computing device, a spectral property difference between voice biometric data captured from a user and user record voice biometric data. The user and the computing device constitute a user-computing device pair, and the voice biometric data is captured by the computing device during a verification transaction. Moreover, the method includes inputting the spectral property difference into a machine learning algorithm, calculating an output score with the machine learning algorithm, and determining the voice biometric data was captured from a live user when the output score satisfies a threshold score.

In another aspect, a computing device for determining user liveness is provided that includes a processor and a memory configured to store data. The computing device is associated with a network and the memory is in communication with the processor and has instructions stored thereon which, when read and executed by said processor, cause said computing device to calculate a spectral property difference between voice biometric data captured from a user and user record voice biometric data. The user and the computing device are a user-computing device pair, and the voice biometric data is captured by the computing device during a verification transaction. The instructions when read and executed by the processor also cause the computing device to input the spectral property difference into a machine learning algorithm, calculate an output score with the machine learning algorithm, and determine the voice biometric data was captured from a live user when the output score satisfies a threshold score.

In yet another aspect, a computer program recorded on a non-transitory computer-readable recording medium included in a computing device is provided. The computer program is for enhancing user liveness detection results and includes instructions, which when read and executed by the computing device, cause the computing device to calculate a spectral property difference between voice biometric data captured from a user and user record voice biometric data. The user and the computing device are a user-computing device pair, and the voice biometric data is captured by the computing device during a verification transaction. Moreover, the instructions when read and executed by the processor, cause the computing device to input the spectral property difference into a machine learning algorithm, calculate an output score with the machine learning algorithm, and determine the voice biometric data was captured from a live user when the output score satisfies a threshold score.

DETAILED DESCRIPTION OF THE INVENTION

Figure 1:
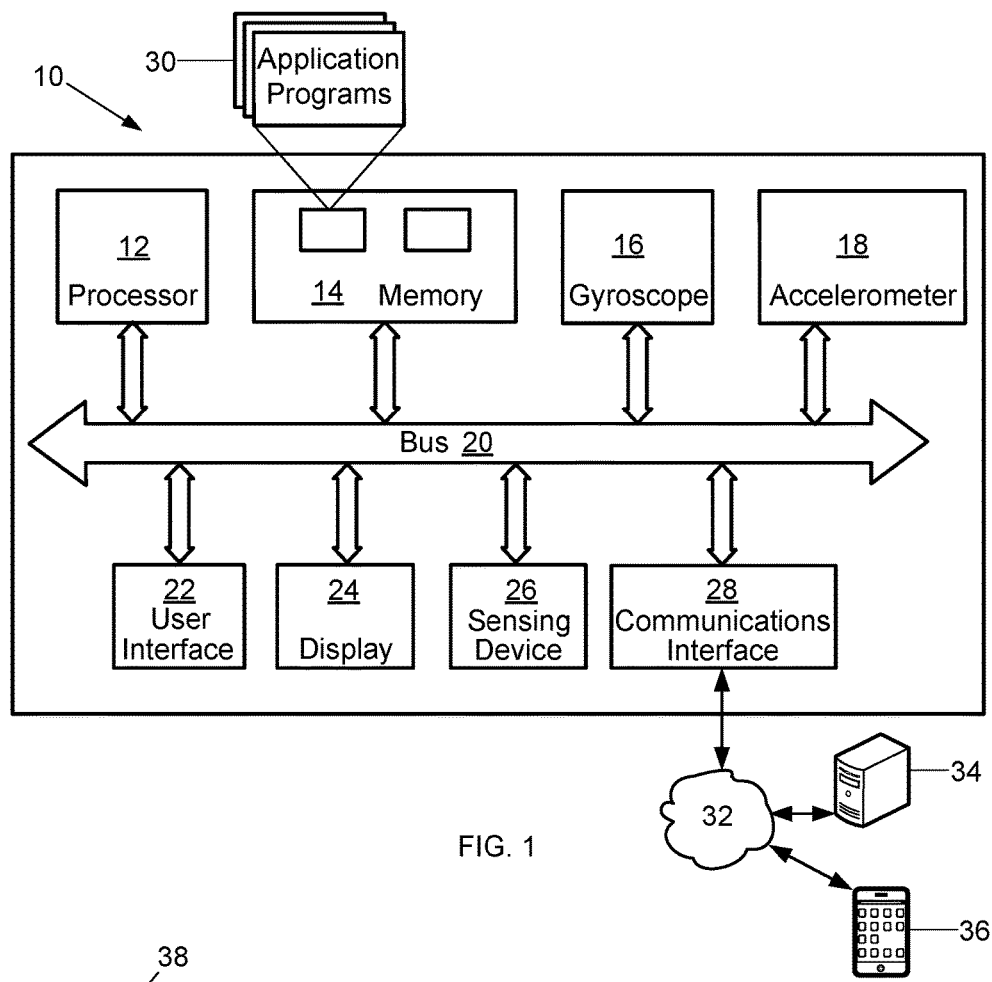
FIG. 1 is a diagram including an example computing device used for determining user liveness based on biometric data captured from a user.

FIG. 1 is a diagram including an example computing device 10 used for determining user liveness based on biometric data captured from a user. The computing device 10 may include components such as, but not limited to, one or more processors 12, a memory 14, a gyroscope 16, one or more accelerometers 18, a bus 20, a user interface 22, a display 24, a sensing device 26 and a communications interface 28. General communication between the components in the computing device 10 is provided via the bus 20.

The computing device 10 may be any device capable of at least capturing biometric data from users, processing the captured biometric data, and performing the functions described herein. One example of the computing device 10 is a smart phone. Other examples of the computing device 10 include, but are not limited to, a cellular phone, a tablet computer, a phablet computer, a laptop computer, a personal computer (PC), and any type of device having wired or wireless networking capabilities such as a personal digital assistant (PDA).

The processor 12 executes instructions, or computer programs, stored in the memory 14. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing at least a portion of the functions and/or methods described herein. The above examples are not intended to limit in any way the definition and/or meaning of the term "processor."

As used herein, the term "computer program" is intended to encompass an executable program that exists permanently or temporarily on any non-transitory computer-readable recordable medium that causes the computing device 10 to perform at least a portion of the functions and/or methods described herein. Application programs 30, also known as applications, are computer programs stored in the memory 14. Application programs 30 include, but are not limited to, an operating system, an Internet browser application, enrolment applications, authentication applications, user liveness detection applications, applications that use pre-trained models based on machine learning algorithms, feature vector generator applications, non-negative matrix factorization algorithm applications, vector quantization algorithm applications, machine learning algorithm applications, and any special computer program that manages the relationship between application software and any suitable variety of hardware that helps to make-up a computer system or computing environment.

Authentication applications enable the computing device 10 to conduct authentication transactions which include verification and identification transactions (1:N), where "N" is a number of records in an authentication database. Machine learning algorithm applications include at least classifiers and regressors, and may process data to generate a classification model. For example, a machine learning algorithm may process data to facilitate determining whether or not a user is live. Examples of machine learning algorithms include, but are not limited to, support vector machine (SVM) learning algorithms, linear discriminant analysis learning algorithms, and artificial neural network learning algorithms. Non-negative matrix factorization algorithms provide an approximation of any matrix with positive elements as a product of two matrices. K-means clustering applications are a type of vector quantization algorithm application.

The memory 14 may be any non-transitory computer-readable recording medium used to store data such as, but not limited to, computer programs and user data records. The data record for each user includes data such as, but not limited to, record biometric data, record biometric templates, matrices, and personal data of the user. The record biometric data is biometric data captured from a user that may be processed to generate at least one record biometric template. For voice biometric data the record biometric data is an audio digital signal.

The process of verifying the identity of a user is known as a verification transaction. Typically, after capturing biometric data from a user during a verification transaction a biometric template is generated from the captured biometric data. The generated biometric template is compared against the corresponding user record biometric template and if the generated and record templates match, the identity of the user is verified as true. Alternatively, the biometric data captured from the user may be compared against the corresponding user record biometric data to verify the identity of the user.

Personal data includes any demographic information regarding a user such as, but not limited to, a user's name, gender, age, date-of-birth, address, citizenship and marital status. Each data record may also include any kind of data that may be used to enhance the trustworthiness of user liveness detection results and authentication transaction results. The data records are typically for users who operate or own the computing device 10.

Configurable policies for determining record data requirements and authentication data requirements, respectively, may also be stored in the memory 14. A record data requirement is data desired to be captured from a user and stored in the corresponding user data record prior to conducting authentication transactions for the user. An authentication data requirement is the data desired to be captured from a user during either a verification or identification transaction. As described herein, the record and authentication data requirements are for voice biometric data. Generally, the voice biometric data is a known phrase spoken by the user 38 but may alternatively be a single letter or number, a group of letters or numbers, any combination of letters and numbers, or one or more sentences spoken by the user. The voice biometric data may be captured as an audio digital signal, may be an audio digital signal extracted from a video of the user, or may be captured as a continuous analog signal and converted into an audio digital signal. A video includes a sequence of frames each of which may be time stamped by the computing device 10.

Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like. Furthermore, the non-transitory computer-readable recording media may be implemented as smart cards, SIMs, any type of physical and/or virtual storage, or any other digital source such as a network or the Internet from which a computing device can read computer programs, applications or executable instructions.

The gyroscope 16 and the accelerometer 18 generate data regarding rotation and translation of the computing device 10 that may be communicated to the processor 12 and the memory 14 via the bus 20.

The user interface 22 and the display 24 allow interaction between a user and the computing device 10. The display 24 may include a visual display or monitor that displays information to a user. For example, the display 24 may be a Liquid Crystal Display (LCD), active matrix display, plasma display, or cathode ray tube (CRT). The user interface 22 may include a keypad, a keyboard, a mouse, an infrared light source, a microphone, cameras, and/or speakers. Moreover, the user interface 22 and the display 24 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the person to interact with the device 10 to enter data, change settings, control functions, etc. Consequently, when the touch screen is touched, the user interface 22 communicates this change to the processor 12, and settings can be changed or user entered information can be captured and stored in the memory 14.

The sensing device 26 may include Radio Frequency Identification (RFID) components or systems for receiving information from other devices. The sensing device 26 may also include components with Bluetooth, Near Field Communication (NFC), infrared, or other similar capabilities. The computing device 10 may alternatively not include the sensing device 26.

The communications interface 28 provides the computing device 10 with two-way data communications. Moreover, the communications interface 28 enables the computing device 10 to conduct wireless communications such as cellular telephone calls and to wirelessly access the Internet over a network 32. By way of example, the communications interface 28 may be a digital subscriber line (DSL) card or modem, an integrated services digital network (ISDN) card, a cable modem, or a telephone modem to provide a data communication connection to a corresponding type of telephone line. As another example, the communications interface 28 may be a local area network (LAN) card (e.g., for Ethernet™ or an Asynchronous Transfer Model (ATM) network) to provide a data communication connection to a compatible LAN. As yet another example, the communications interface 28 may be a wire or a cable connecting the computing device 10 with a LAN, or with accessories such as, but not limited to, biometric capture devices. Further, the communications interface 28 may include peripheral interface devices, such as a Universal Serial Bus (USB) interface, a PCMCIA (Personal Computer Memory Card International Association) interface, and the like. Thus, it should be understood the communications interface 28 may enable the computing device 10 to conduct any type of wireless or wired communications such as, but not limited to, accessing the Internet. Although the computing device 10 includes a single communications interface 28, the computing device 10 may alternatively include multiple communications interfaces 28.

The communications interface 28 also allows the exchange of information across the network 32. The exchange of information may involve the transmission of radio frequency (RF) signals through an antenna (not shown). Moreover, the exchange of information may be between the computing device 10 and any number of other computer systems 34 and any number of other computing devices 36 capable of communicating over the network 32. The network 32 may be a 5G communications network. Alternatively, the network 32 may be any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 32 may also be any type of wired network or a combination of wired and wireless networks.

The computer systems 34 and the computing devices 36 typically include at least some of the components that might be included in the computing device 10. The systems 34 may additionally, or alternatively, include a web server, a database server, an application server, a directory server, and a disk storage unit that may be used to store any kind of data. The disk storage unit may store at least one database such as, but not limited to, an authentication database. The application server stores applications therein that cause the computer system 34 to perform the functions described herein. Some or all of the applications that may be stored in the computing device 10 may also be stored in the computing systems 34 and devices 36.

Examples of computer systems 34 include computer systems of service providers such as, but not limited to, financial institutions, medical facilities, national security agencies, merchants, and authenticators. The computing devices 36 and the computing device 10 are similar. Thus, examples of the computing devices 36 include, but are not limited to, smart phones, tablet computers, phablet computers, laptop computers, personal computers and cellular phones. The computer systems 34 and the computing devices 36 may be operated by, and/or owned by, any individual or any type of entity including, but not limited to, commercial and non-commercial entities. The computing devices 36 may alternatively be computer systems 34 as described herein, and the computer systems 34 may alternatively be computing devices 36 as described herein. The computing devices 10, 36 and computer systems 34 may also be considered information systems.

Figure 2:
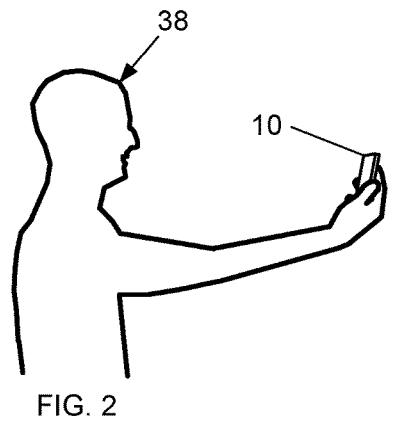
FIG. 2 is a side view of a person capturing voice biometric data from his or her self with the example computing device illustrated in FIG. 1.

FIG. 2 is a side view of a person 38 capturing biometric data from his or her self with the computing device 10. The person from whom biometric data is captured is referred to herein as a user. The user also typically operates the computing device 10 during capture. However, a different person may operate the computing device 10 while the computing device 10 captures biometric data from the user 38. The biometric data may be captured from a user for any reason, for example, to remotely enroll a user in a biometric authentication system or to verify the identity of a user during a verification transaction.

A user-computing device pair is defined as the user from whom voice biometric data is captured and the computing device 10 used to capture the voice biometric data. Information regarding each user-computing device pair may be stored in the memory 14. Several different voice biometric data samples may be captured from the user with the same computing device 10 and stored in the computing device 10. Because the samples were captured from the same user with the same computing device 10, each sample is related to the same user-computing device pair in the memory 14. Different voice biometric data samples may also be captured from the same user with different computing devices 10. When different computing devices 10 are used, each voice biometric data sample is related to the corresponding user-computing device pair in the memory 14.

Figure 3:
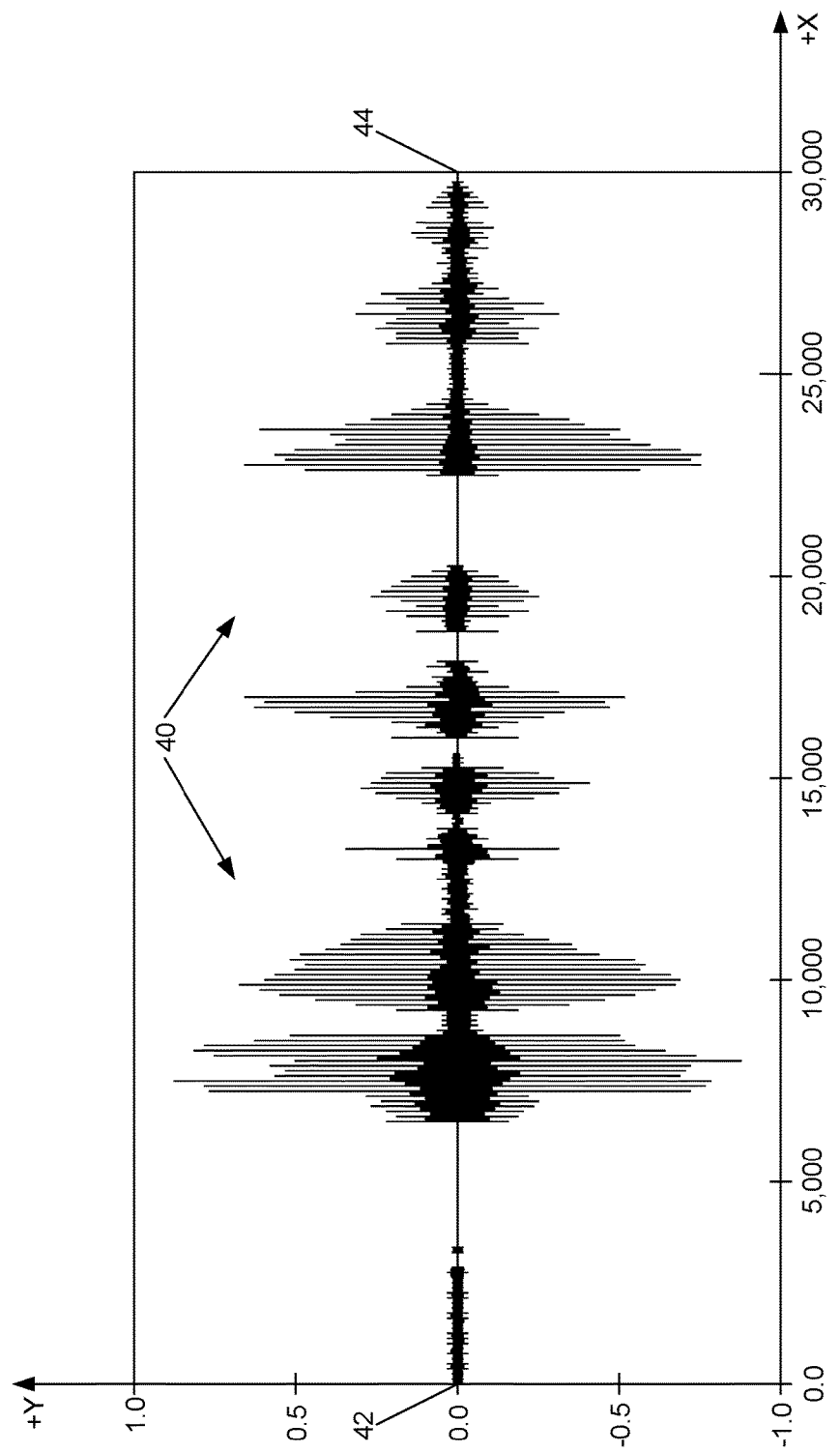
FIG. 3 is a diagram illustrating an example audio digital signal which represents voice biometric data captured from a person.

FIG. 3 is a diagram illustrating an example audio digital signal 40. The audio digital signal 40 represents voice biometric data. The audio digital signal 40 may be stored in the computing device 10 prior to conducting verification transactions for the user or may be captured from the user during a verification transaction. The audio digital signal 40 is plotted on a Cartesian coordinate system having X and Y-axes. The X-axis represents the number of discrete elements included in the captured voice biometric data in which each discrete element is captured at a rate, in seconds, equal to the inverse of a sampling frequency. The Y-axis represents the normalized values of the discrete elements of the signal 40. Alternatively, the Y-axis may represent the actual values of the discrete elements in the signal 40. The signal 40 extends from the origin 42 to a terminus 44 and has a duration of about three (3) seconds. The duration of the signal 40 depends on the phrase spoken by the user.

During voice biometric data capture user utterances are altered by additive and convolutive noises. Additive noise is due to the background noise around the user. Convolutive noise is caused by the computing device itself because the computing device causes a filtering process to occur when user utterances are captured as voice biometric data by the computing device. Thus, the computing device itself acts as a filter having a transfer function. Each computing device has unique channel characteristics defined by the transfer function of the computing device which alter user utterances captured as voice biometric data. Thus, voice biometric data captured by the same computing device should always exhibit substantially the same channel characteristics.

A user typically captures his or her own voice biometric data with his or her own computing device 10. Consequently, voice biometric data captured from a user with his or her own computing device 10 should always exhibit substantially the same channel characteristics. Voice biometric data captured from the user with a computing device different than his or her own computing device 10 exhibits different channel characteristics.

The different computing device may be a replay device. Imposters have been known to use replay devices to replay voice biometric data previously captured from a user to impersonate the user during a verification transaction. Replay devices may be any device capable of replaying recorded audio, for example, cassette players and computing devices 10.

A genuine user utterance, replayed during a verification transaction, may be altered by the communication channels from three different processes, or computing devices. The first process occurs when an impostor eavesdrops on a genuine biometric verification transaction and surreptitiously captures a genuine user utterance as voice biometric data with a first computing device. The second process occurs when a second computing device replays the surreptitiously captured voice biometric data during another verification transaction, and the third process occurs when the replayed voice biometric data is captured by a third computing device.

A genuine user utterance surreptitiously captured as voice biometric data by the first computing device is altered by the convolutive noise caused by the communication channel unique to the first computing device. Replaying the surreptitiously captured voice biometric data with the second computing device alters the surreptitiously captured voice biometric data with the convolutive noise caused by the communication channel unique to the second computing device. The surreptitiously captured voice biometric data is further altered by the convolutive noise unique to the third computing device when the third computing device captures the voice biometric data replayed by the second computing device.

The first and second computing devices may be the same or different. When the first and second computing devices are different, the voice biometric data captured by the third computing device includes convolutive noise caused by the communication channels of three different computing devices. When the first and second computing devices are the same, the voice biometric data captured by the third computing device includes convolutive noise twice caused by the same computing device and convolutive noise caused by the third computing device.

The convolutive noise effects the spectral properties of the captured voice biometric data. Because the convolutive noise of each computing device is unique, each different computing device effects the spectral properties of captured voice biometric data differently. Thus, differences in spectral properties between record voice biometric data and voice biometric data captured during a verification transaction may be used to show that a replay device was used during the verification transaction and thus that the captured voice biometric data was not from a live user. Such spectral properties may include power spectral density and any other spectral or cepstral based acoustic features extracted from the biometric data. Examples of extracted spectral or cepstral based acoustic features include, but are not limited to, Mel Frequency Cepstral Coefficients and Constant Q.

The information shown in FIGS. 4-7 is substantially the same information shown in FIG. 3 as described in more detail below. As such, features illustrated in FIGS. 4-7 that are identical to features illustrated in FIG. 3, are identified using the same reference numerals used in FIG. 3.

Figure 4:
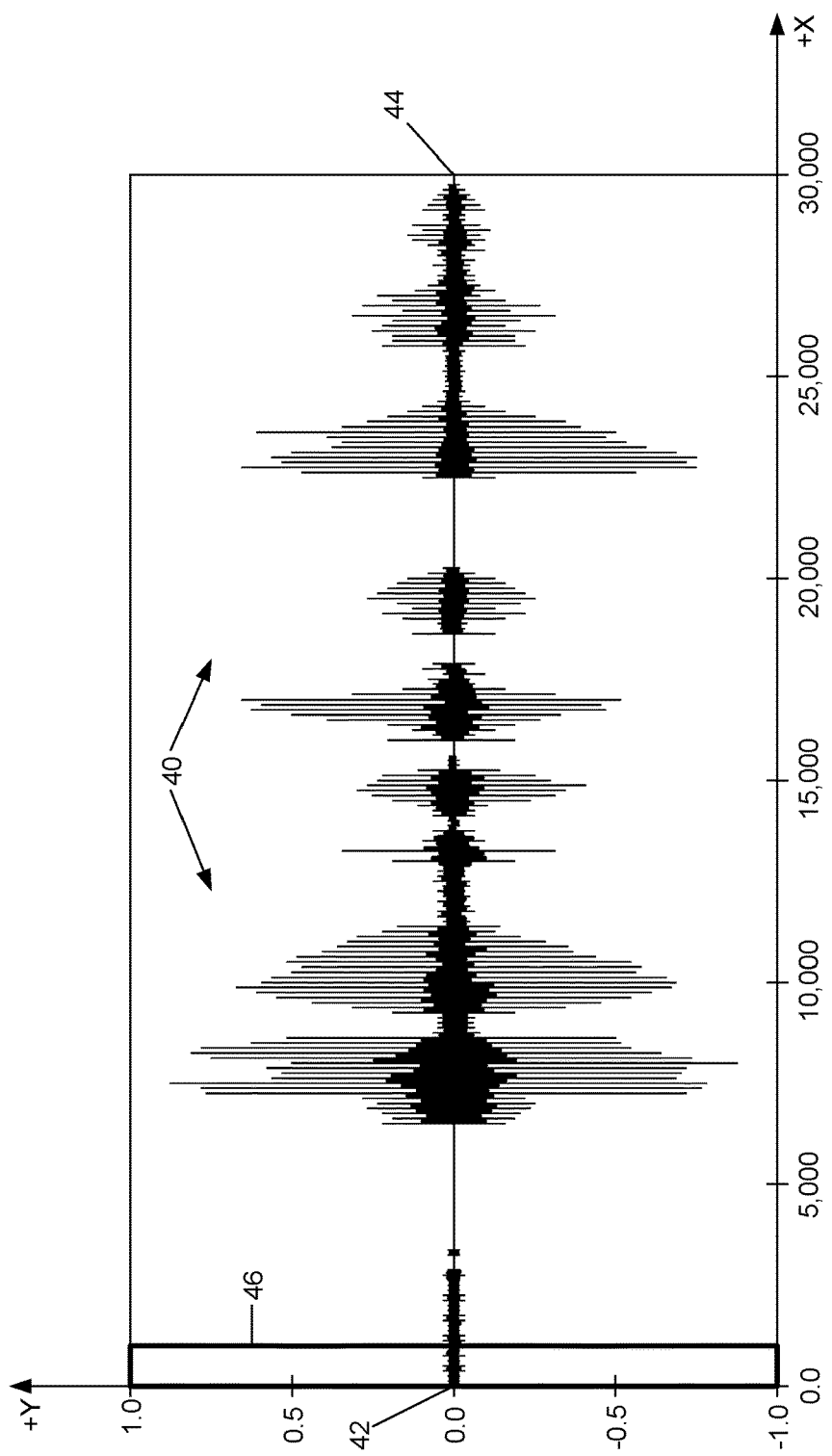
FIG. 4 is a diagram illustrating the audio digital signal as shown in FIG. 3 further including a temporal window.

FIG. 4 is a diagram illustrating the audio digital signal 40 as shown in FIG. 3 further including a temporal window 46. The temporal window 46 is located in an initial position flush with the origin 42 and has a duration of twenty-five (25) milliseconds. Alternatively, the temporal window 46 may be of any duration that facilitates calculating spectral vectors as described herein. The window 46 is translated in the positive direction along the X-axis in ten (10) millisecond increments from the origin 42 to the terminus 44. Alternatively, the temporal window 46 may be translated at any time increment that facilitates calculating spectral vectors as described herein. The temporal window 46 occupies many different positions over the signal 40 while being translated along the signal 40.

In each different position, the window 46 includes a different portion of the signal 40, which portion is processed by a Fast Fourier Transform (FFT) to create a FFT vector. The FFT vector includes modules which are used to create a spectral vector for the portion of the signal 40 within the window 46. A spectral vector is similarly created for each different position of the window 46. The spectral vectors may be stored in the computing device 10. After creating a spectral vector, the temporal window 46 is translated by ten (10) milliseconds along the X-axis into a different position.

Figure 5:
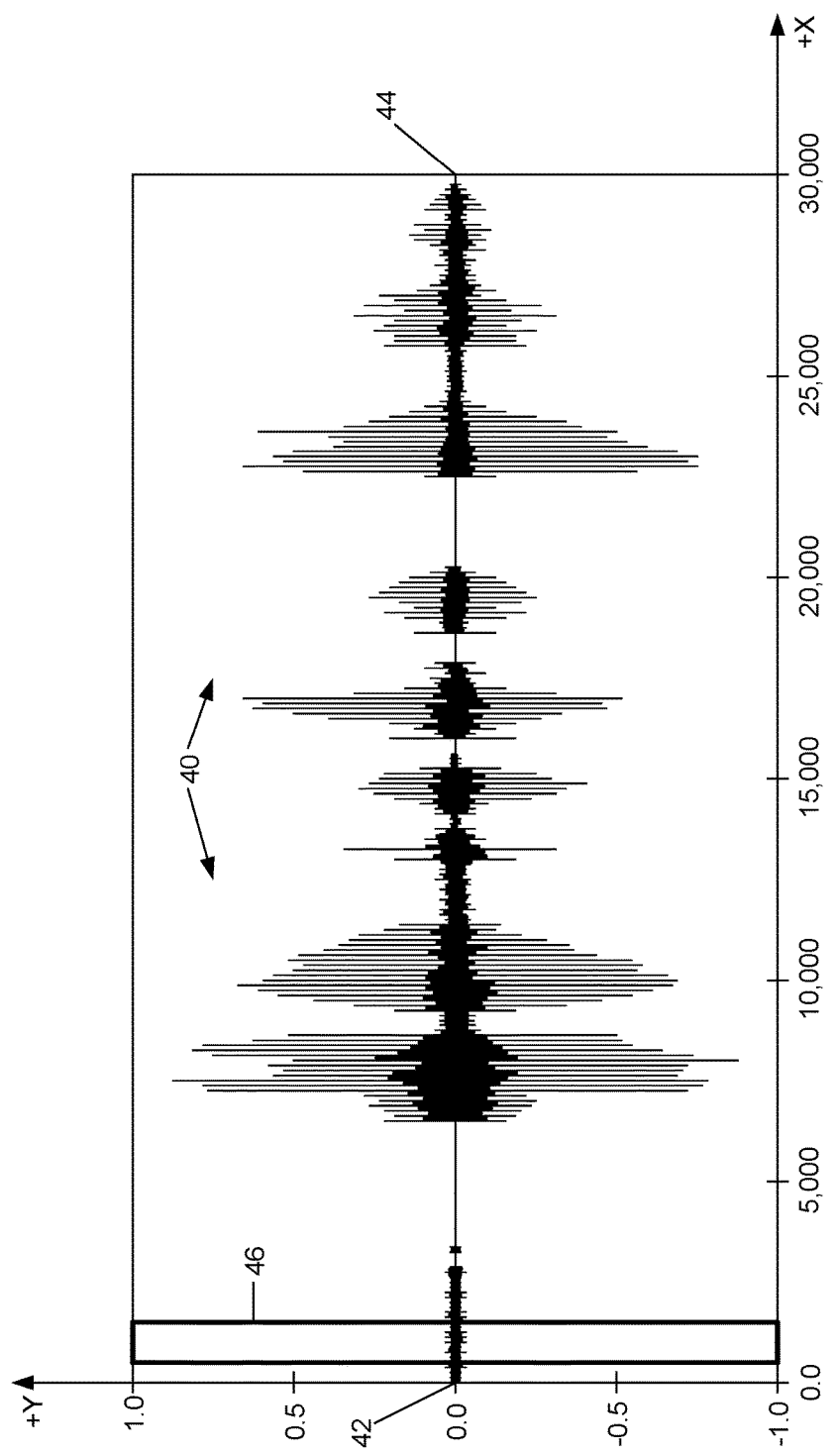
FIG. 5 is a diagram illustrating the audio digital signal as shown in FIG. 4 including the temporal window located in a different position.

FIG. 5 is a diagram illustrating the audio digital signal 40 as shown in FIG. 4 including the temporal window 46 located in the different position. The spectral vector for the portion of the signal 40 within the differently positioned window 46 is created as described herein with regard to FIG. 4. After creating the spectral vector, the temporal window 46 is translated by ten (10) milliseconds along the X-axis into another different position.

Figure 6:
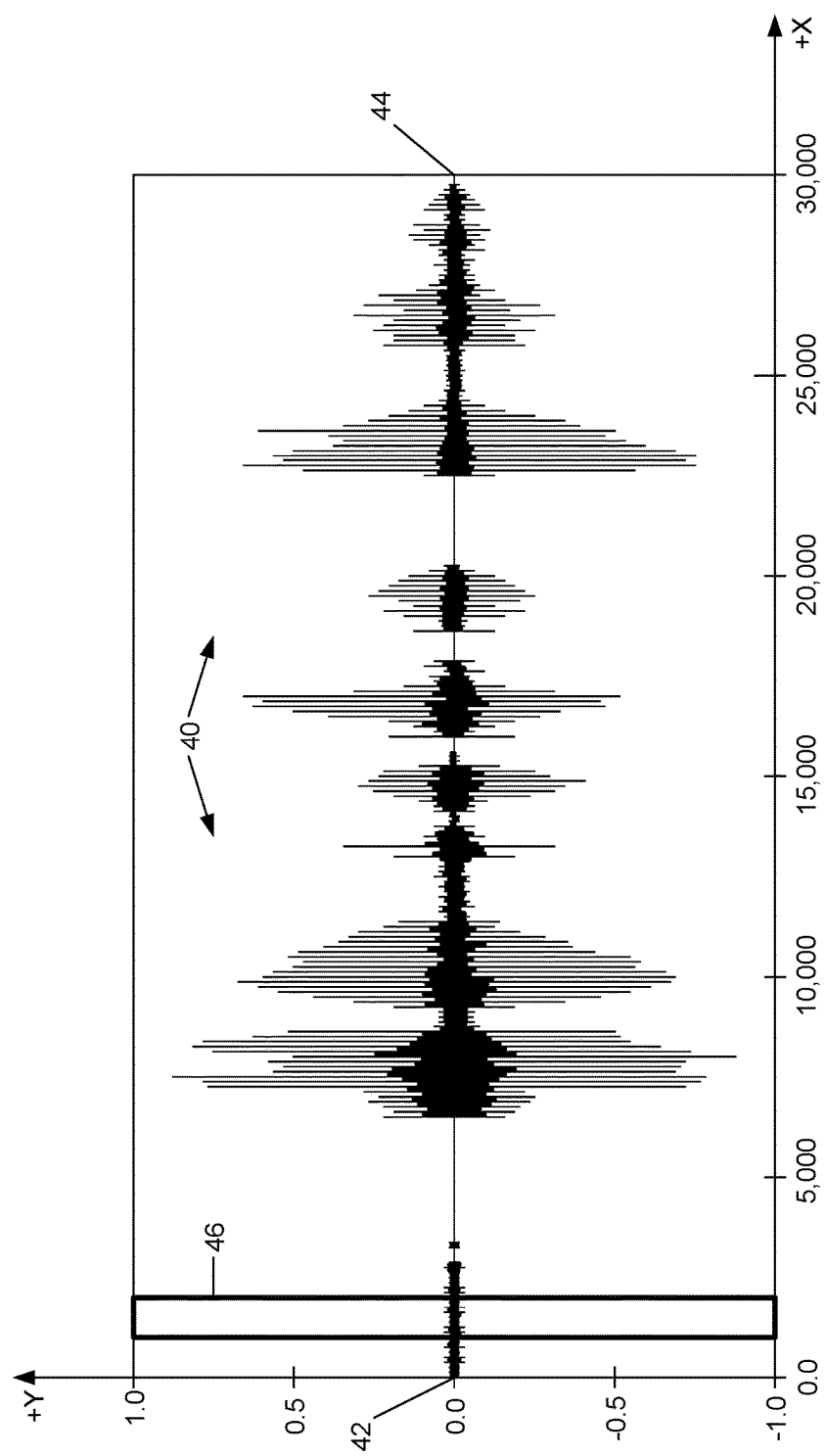
FIG. 6 is a diagram illustrating the audio digital signal as shown in FIG. 5 including the temporal window located in another different position.

FIG. 6 is a diagram illustrating the audio digital signal 40 as shown in FIG. 5 including the temporal window 46 located in another different position. The spectral vector for the portion of the signal 40 within the differently positioned window 46 is created as described herein with regard to FIG. 4. After creating the spectrum vector, the temporal window 46 is translated by ten (10) milliseconds along the X-axis into yet another different position.

Figure 7:
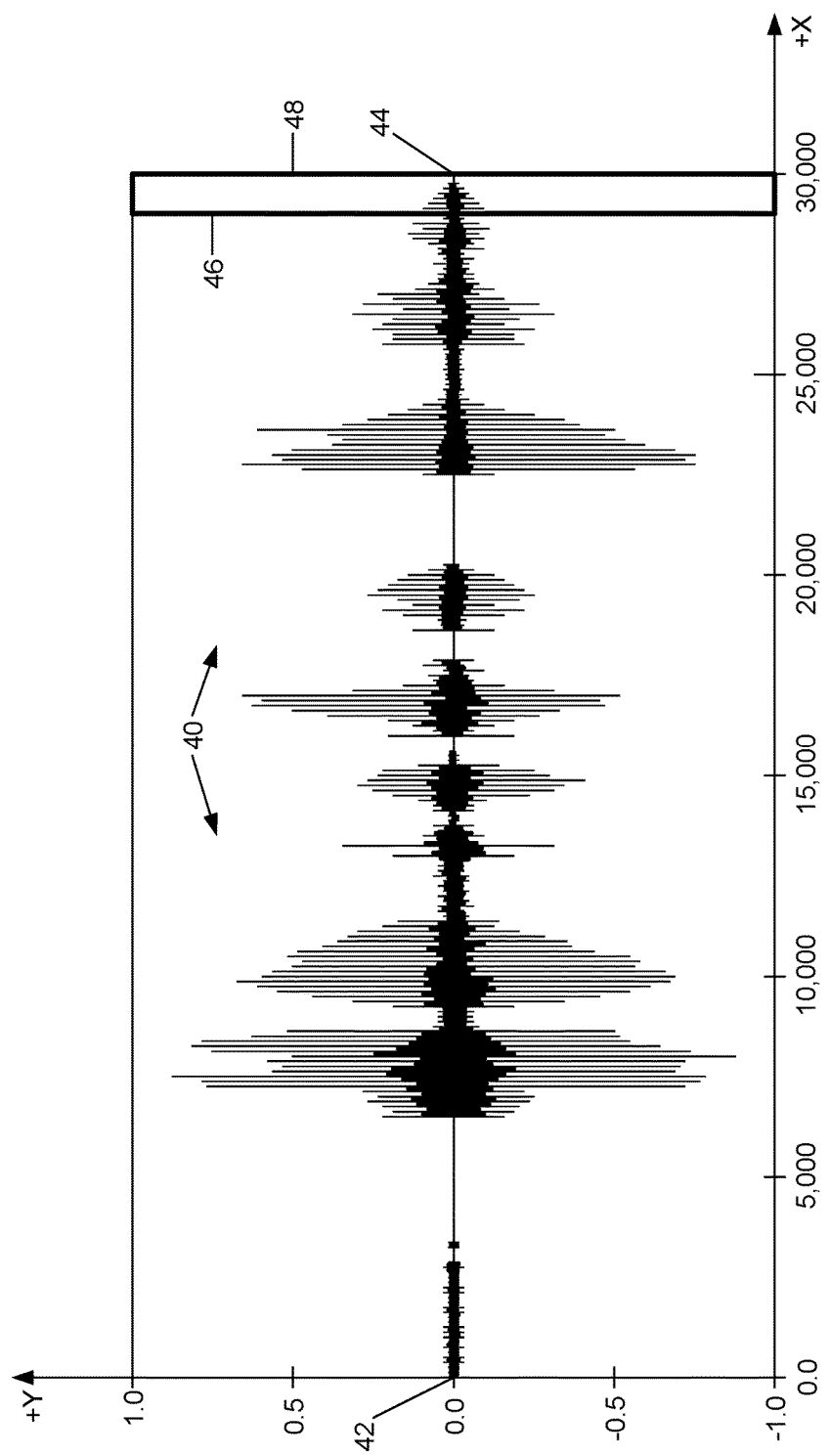
FIG. 7 is a diagram illustrating the audio digital signal as shown in FIG. 6 including the temporal window located in a final position.

FIG. 7 is a diagram illustrating the audio digital signal 40 as shown in FIG. 6 including the temporal window 46 located in a final position. In the final position, a side 48 of the temporal window 46 is flush with the terminus 44. More specifically, the temporal window 46 has been translated over the duration of the signal 40 to the final position. After creating the spectral vector for the portion of the signal 40 within the finally positioned window 46, a matrix Y is created by concatenating the spectral vectors created for the signal 40. The matrix Y may alternatively be created in any manner.

Audio digital signals 40 for a user-computing device pair may be processed as described above with regard to FIGS. 4-7 to create matrices $Y_{1\ to\ k}$. The matrices $Y_{1\ to\ k}$ may be stored in the computing device 10. The designation "k" as used in conjunction with the matrix designation Y is intended to indicate the number of audio digital signals stored in the computing device 10 that are related to the user-computing device pair in the memory 14. The matrices $Y_{1\ to\ k}$ may be concatenated to form a concatenated matrix $Y_c$, and a non-negative matrix factorization algorithm may be used to factorize the concatenated matrix $Y_c$ to estimate a spectral shape matrix W and an expansion coefficients matrix H. Alternatively, a vector quantization algorithm may be used to estimate the spectral shape matrix W. The columns of the spectral shape matrix W each define a spectral shape vector that characterizes a user-device pair.

When a non-negative matrix factorization algorithm is used to compute the spectral shape matrix W, the matrix Y may be any type of matrix that includes only positive elements derived from user speech. Such matrices include, but are not limited to, a mel-spectrum matrix, and a constant Q transform matrix. When a vector quantization algorithm application is used to compute the spectral shape matrix W, the matrix Y may represent any frequency based audio feature.

When a non-negative matrix factorization algorithm is used the concatenated matrix $Y_c$ and the matrices W and H are related as $Y_c \approx WH$. Because the matrices W and H are estimates, the product of WH is slightly different than $Y_c$. To account for the slight difference a normalization vector T may be calculated. The normalization vector T is calculated as a function of the matrix $Y_c$ and the product of WH. For example, the normalization vector T may be calculated as the column-wise average of the ratio between the matrix $Y_c$ and the product of WH. Alternatively, the normalization vector T may be calculated in any manner that facilitates determining whether captured voice biometric data was, or was not, replayed as described herein. The spectral shape matrix W and the normalization vector T for the user-computing device pair are determined and stored in the computing device 10 prior to conducting verification transactions for the user. A spectral shape matrix W and a normalization vector T may likewise be determined and stored for each different user-computing device pair. The spectral shape matrix W and the normalization vector T are each different for each user-computing device pair.

A small number of spectral shape vectors is sufficient to quickly generate accurate replay detection results using the methods described herein. Consequently, the spectral shape matrix W includes a small number of columns. Because the matrix W includes a small number of columns little memory is required to store the spectral shape matrix W. A small number of columns may be between five and ten for verification transactions based on text-dependent voice biometric data. For verification transactions based on text-independent voice biometric data a small number of columns may be between five and twenty. However, any number of columns may alternatively be used that is deemed suitable for quickly generating accurate replay detection results for either text-dependent or text-independent voice biometric data.

Because the spectral shape matrix W includes a small number of spectral shapes, few computations are required which facilitates quickly calculating accurate and trustworthy audio replay spoofing detection results and facilitates economizing computing power and/or computing capacity versus known replay detection algorithms.

Figure 8:
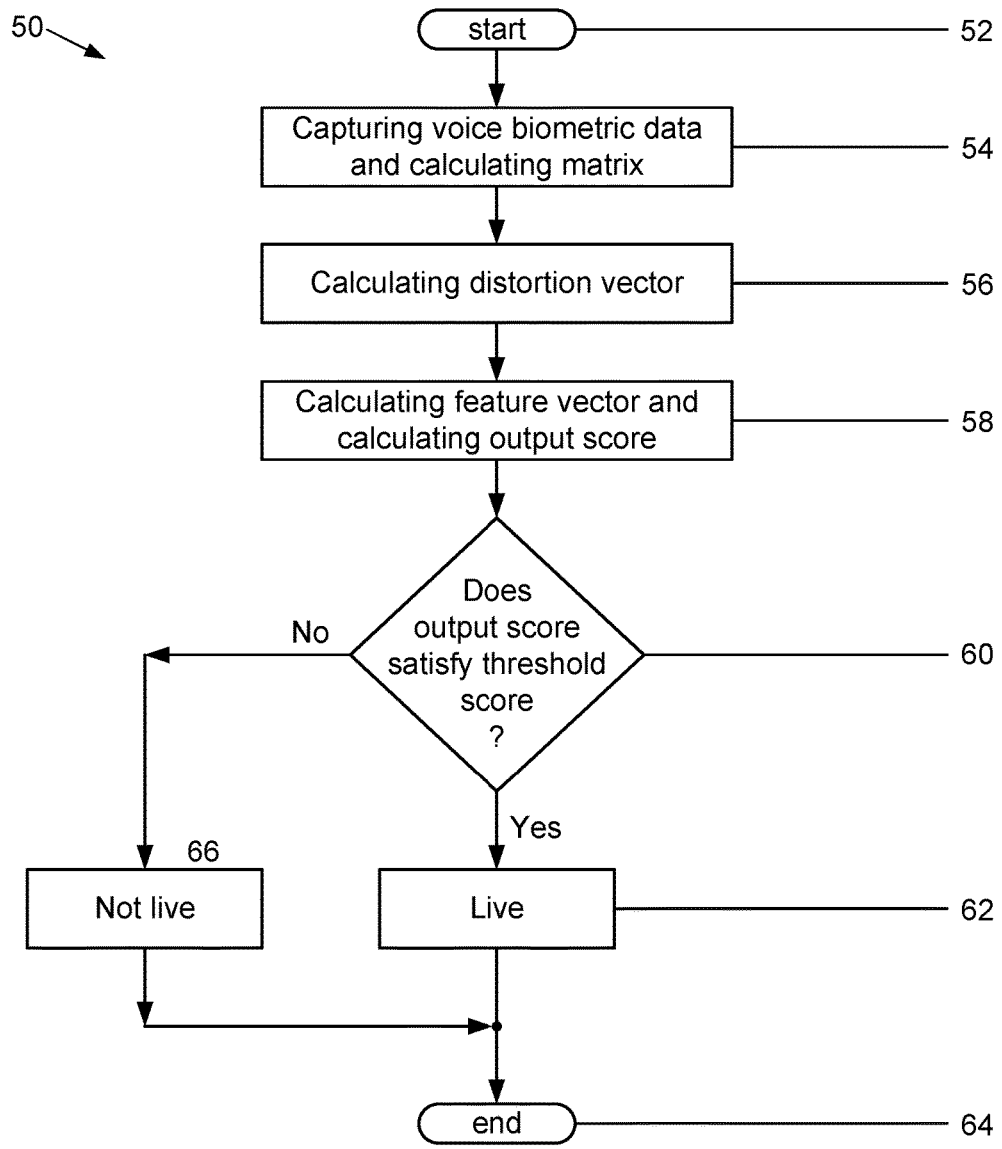
FIG. 8 is a flowchart illustrating an example method for determining user liveness based on biometric data captured from the user.

FIG. 8 is a flowchart 50 illustrating an example method for determining user liveness based on biometric data captured from the user. When biometric data is captured from a user as part of a verification transaction, the user may be required to prove he or she is live before being permitted to conduct, using the computing device 10, a network-based transaction. Such network-based transactions include, but are not limited to, buying merchandise from a merchant service provider website and accessing top secret information from a computer system.

The method starts 52 by capturing 54 voice biometric data from the user with the computing device 10 during a verification transaction. Next, processing continues by calculating 54 a matrix $Y_{verification}$ for the captured voice biometric data and calculating an expansion coefficient matrix $H_{verification}$ using the relationship $Y_{verification} \approx WH_{verification}$. The matrix $Y_{verification}$ is calculated in the same manner as the matrix Y which was calculated before conducting verification transactions for the user. The spectral shape matrix W for the user-computing device pair estimated prior to conducting verification transactions for the user is used to calculate the expansion coefficient matrix $H_{verification}$. In this example method, the spectral shape matrix W was calculated using a non-negative matrix factorization algorithm.

After calculating the expansion coefficient matrix $H_{verification}$, a distortion vector $T_{distortion}$ is calculated 56 based on the matrix)(verification and the product of $WH_{verification}$. The distortion vector $T_{distortion}$ is calculated in the same manner as the normalization vector T. Next, processing continues by calculating 58 a feature vector as the element wise function between the square value of the distortion vector $T_{distortion}$ and the square value of the normalization vector T, and inputting the feature vector into a machine learning algorithm which calculates 58 an output score. The function may be a ratio or the log difference between the distortion vector $T_{distortion}$ and normalization vectors T. The feature vector is an estimation of the difference in the spectral properties between the captured and record voice biometric data. The feature vector also includes coefficients that may be used to facilitate determining whether the recording is live or not.

Processing continues by determining 60 whether or not the output score satisfies a threshold score. More specifically, processing continues by comparing the output score against a threshold score. When the output score satisfies the threshold score, processing continues by concluding there is little difference in spectral properties between the captured and record voice biometric data. As a result processing continues by determining the captured voice biometric data was not replayed and was thus captured from a live user 62. A message indicating the user is live may be transmitted to a service provider computer system operating the website on which the user desires to conduct the network-based transaction. Next, processing ends 64.

Otherwise, when the output score does not satisfy the threshold score processing continues by concluding the captured voice biometric data was replayed and was thus not captured 66 from a live user. A message indicating the user is not live may be transmitted to the service provider computer system operating the website on which the user desires to conduct the network-based transaction. Next, processing ends 64.

The output score may satisfy the threshold score when the output score is equal to or greater than the threshold score, greater than the threshold score, less than the threshold score, or less than or equal to the threshold score.

Although the example method calculates the distortion vector $T_{distortion}$ based on the matrix $Y_{verification}$ and the product of $WH_{verification}$, calculates the feature vector using the distortion vector $T_{distortion}$, calculates an output score based on the feature vector and determines a liveness detection result based on the output scores, the liveness detection result may alternatively be determined in any manner using the same matrices and vectors. For example, a distortion vector D may be calculated for each spectral vector included in the spectral matrix $Y_{verification}$ as the ratio between the spectral vector and the product of the corresponding columns and rows of the spectral shape matrix W and the expansion coefficient matrix H, respectively. A feature value for each distortion vector may be calculated as an element wise function between the square value of each distortion vector D and the square value of the record normalization vector T. Each feature value may be input to the machine learning algorithm which generates respective elementary scores. The elementary scores may be averaged and the average compared against the threshold score. When the average satisfies the threshold score, the captured biometric data is considered to be from a live user; otherwise, not.

Although the example method uses the record spectral shape matrix W and the record normalization vector T determined for a user-computing device pair before conducting the verification transaction, such record data may not be available for some users. When this data is not available for a user, matrices W and normalization vectors T for other different users may be used. Some users may have more than one user-computing device pair and thus have more than one value for the matrix W and the normalization vector T. More specifically, after calculating the matrix $Y_{verification}$ from biometric data captured from the user, processing may continue by calculating a different value for the expansion coefficient matrix $H_{verification}$ for each different user-computing device pair based on the different value W associated with each different user-computing device pair.

A distortion vector $T_{distortion}$ may be calculated for each different user-computing device pair and a feature vector may be defined for each different user-computing device pair using the respective normalization vector T. Each feature vector may be input into the machine learning algorithm to calculate a separate output score for each vector. The output scores may be processed and the result may be compared against a threshold score. The output scores may be processed in any manner, for example, the output scores may be averaged and the average compared against the threshold score. When the average satisfies the threshold score, the captured voice biometric data is considered genuine and thus captured from a live user. The threshold score may be different versus the threshold score used when record data is available for the user.

Although the example method uses a spectral shape matrix W calculated by a non-negative matrix factorization algorithm, the spectral shape matrix W may alternatively be calculated using a vector factorization algorithm application, for example, a k-clustering algorithm application. The clustering algorithm calculates a set $W_{verification}$ of cluster vectors which each correspond to a vector in the spectral shape matrix W. The Euclidian distance between vectors is calculated and the correspondence is determined based on the calculated distance. Each calculated distance is inputted into the machine learning algorithm which calculates an elementary output score. The elementary output scores are summed to calculate a global score which is compared against the threshold score to determine 60 whether or not the output score satisfies the threshold score. When the output score satisfies the threshold score 60, the captured voice biometric data is considered genuine and thus captured from a live user 62.

The example methods described herein may be conducted entirely by the computing device 10, or partly on the computing device 10 and partly on other computer systems 34 and computing devices 36 operable to communicate with the computing device 10 over the network 32 or otherwise. Moreover, the example methods described herein may be conducted entirely on the computer systems 34 and computing devices 36. Thus, the example methods may be conducted on any combination of computer systems 34 and computing devices 36. Furthermore, data described herein as being stored in the memory 14 may alternatively be stored in any computer system 34 or computing device 36 operable to communicate over the network 32. Additionally, the example methods described herein may be implemented with any number and organization of computer program components. Thus, the methods described herein are not limited to specific computer-executable instructions. Alternative example methods may include different computer-executable instructions or components having more or less functionality than described herein.

The above-described example methods and systems enhance the trustworthiness of audio replay spoofing detection results generated from captured voice biometric data. More specifically, during a verification transaction, a user captures voice biometric data from his or her self with a computing device and a matrix Y is calculated from the captured voice biometric data. The user and computing device form a user-computing device pair. The matrix Y and a record spectral shape matrix W for the user-computing device pair are used to calculate an expansion coefficient matrix. A distortion vector is calculated based on the matrix Y, the expansion coefficient matrix and the record spectral shape matrix W. The spectral shape matrix W includes a small number of spectral shape vectors, so few computations are required. Next, a feature vector is calculated as an element-wise function between the square value of the distortion vector and the square value of a record normalization vector.

The feature vector is input into a machine learning algorithm which calculates an output score. If the output score satisfies a threshold score, the captured voice biometric data is not considered to have been replayed and is thus considered to be from a live user. Otherwise, the captured voice biometric data is considered to have been replayed and not from a live user. As a result, the speed, accuracy and trustworthiness of audio replay spoofing detection results are facilitated to be enhanced, computer capacity and/or computing power are facilitated to be economized versus known replay detection algorithms, and costs incurred due to successful spoofing and faulty verification transaction results are facilitated to be reduced.

The example methods for determining user liveness described above should not be considered to imply a fixed order for performing the method steps. Rather, the method steps may be performed in any order that is practicable, including simultaneous performance of at least some steps. Moreover, the method steps may be performed in real time or in near real time. Furthermore, the invention is not limited to the embodiments of the methods described above in detail. Rather, other variations of the methods may be utilized within the spirit and scope of the claims.

What is claimed is:

1. A method for determining user liveness comprising:
   capturing, by a computing device, voice biometric data of a user during a verification transaction, the user and computing device being a user-computing device pair;
   calculating a first matrix for the captured voice biometric data;
   calculating an expansion coefficient matrix based on the first matrix and a record spectral shape matrix, the record spectral shape matrix being for the user-computing device pair;
   calculating a distortion vector as the average of a ratio between the first matrix and the product of the record spectral shape matrix and the expansion coefficient matrix; calculating a spectral property difference as an element-wise function between the square value of the distortion vector and the square value of a user record normalization vector;
   inputting the spectral property difference into a machine learning algorithm;
   calculating an output score with the machine learning algorithm, the output score representing the difference between a probability the voice biometric data was captured from a live user and a probability the voice biometric data was not captured from a live user; and
   determining the voice biometric data was captured from a live user when the output score satisfies a threshold score.

2. The method for determining user liveness in accordance with claim 1 further comprising determining the output score satisfies the threshold score when the output score is equal to or greater than the threshold score, the output score is greater than the threshold score, the output score is less than the threshold score, or the output score is equal to or less than the threshold score.

3. The method for determining user liveness in accordance with claim 1 further comprising calculating the expansion coefficient matrix using the equation Y≈HW, where Y is the first matrix, H is the expansion coefficient matrix, and W is the record spectral shape matrix.

4. The method for determining user liveness in accordance with claim 1 further comprising factorizing the first matrix with a non-negative factorization algorithm to estimate the spectral shape matrix.

5. The method for determining user liveness in accordance with claim 1, said calculating a first matrix step comprising:
   determining at least one portion of the captured voice biometric data;
   calculating a spectral vector for the at least one portion; and
   concatenating the spectral vectors to create the first matrix.

6. A computing device for determining user liveness comprising:
   a processor; and
   a memory configured to store data, said computing device being associated with a network and said memory being in communication with said processor and having instructions stored thereon which, when read and executed by said processor, cause said computing device to:
   capture voice biometric data of a user during a verification transaction, the user and computing device being a user-computing device pair;
   calculate a first matrix for the captured voice biometric data;
   calculate an expansion coefficient matrix based on the first matrix and a record spectral shape matrix, the record spectral shape matrix being for the user-computing device pair;
   calculate a distortion vector as the average of a ratio between the first matrix and the product of the record spectral shape matrix and the expansion coefficient matrix;
   calculate a spectral property difference as an element-wise function between the square value of the distortion vector and the square value of a user record normalization vector;
   input the spectral property difference into a machine learning algorithm;
   calculate an output score with the machine learning algorithm, the output score representing the difference between a probability the voice biometric data was captured from a live user and a probability the voice biometric data was not captured from a live user; and
   determine the voice biometric data was captured from a live user when the output score satisfies a threshold score.

7. The computing device for determining user liveness in accordance with claim 6, wherein the instructions when read and executed by said processor, further cause said computing device to determine the output score satisfies the threshold score when the output score is equal to or greater than the threshold score, the output score is greater than the threshold score, the output score is less than the threshold score, or the output score is equal to or less than the threshold score.

8. The computing device for determining user liveness in accordance with claim 6, wherein the instructions when read and executed by said processor, further cause said computing device to calculate the expansion coefficient matrix using the equation Y≈HW, where Y is the first matrix, H is the expansion coefficient matrix, and W is the record spectral shape matrix.

9. The computing device for determining user liveness in accordance with claim 6, wherein the instructions when read and executed by said processor, further cause said computing device to factorize the first matrix with a non-negative factorization algorithm to estimate the spectral shape matrix.

10. The computing device for determining user liveness in accordance with claim 6, wherein the instructions that cause said computing device to calculate a first matrix when read and executed by said processor, further cause said computing device to:
    determine at least one portion of the captured voice biometric data;
    calculate a spectral vector for the at least one portion; and
    concatenate the spectral vectors to create the first matrix.

11. A computer program recorded on a non-transitory computer-readable recording medium included in a computing device for determining user liveness, the computer program being comprised of instructions, which when read and executed by the computing device cause the computing device to:

capture voice biometric data of a user during a verification transaction, the user and computing device being a user-computing device pair;

calculate a first matrix for the captured voice biometric data;

calculate an expansion coefficient matrix based on the first matrix and a record spectral shape matrix, the record spectral shape matrix being for the user-computing device pair;

calculate a distortion vector as the average of a ratio between the first matrix and the product of the record spectral shape matrix and the expansion coefficient matrix;

calculate a spectral property difference as an element-wise function between the square value of the distortion vector and the square value of a user record normalization vector;

input the spectral property difference into a machine learning algorithm;

calculate an output score with the machine learning algorithm, the output score representing the difference between a probability the voice biometric data was captured from a live user and a probability the voice biometric data was not captured from a live user; and determine the voice biometric data was captured from a live user when the output score satisfies a threshold score.

* * * * *